United States Patent [19]

Chacon et al.

[11] Patent Number: 5,602,760

[45] Date of Patent: Feb. 11, 1997

[54] IMAGE-BASED DETECTION AND TRACKING SYSTEM AND PROCESSING METHOD EMPLOYING CLUTTER MEASUREMENTS AND SIGNAL-TO-CLUTTER RATIOS

[75] Inventors: Kim M. Chacon, Arcadia; Gillian K. Groves, Lawndale; Kenneth E. Prager, Los Angeles, all of Calif.

[73] Assignee: Hughes Electronics, Los Angeles, Calif.

[21] Appl. No.: 190,827

[22] Filed: Feb. 2, 1994

[51] Int. Cl.$^6$ .................................... G01S 7/00
[52] U.S. Cl. .......................... 364/516; 342/159
[58] Field of Search .................. 364/516; 342/159, 342/160, 176, 170; 382/103, 190

[56] References Cited

U.S. PATENT DOCUMENTS

| | | | |
|---|---|---|---|
| 4,849,906 | 7/1989 | Chodos et al. | 364/516 |
| 5,001,650 | 3/1991 | Francis et al. | 364/516 |
| 5,061,934 | 10/1991 | Brown et al. | 347/159 |
| 5,062,056 | 10/1991 | Lo et al. | 364/516 |
| 5,179,542 | 1/1993 | Reese et al. | 367/135 |
| 5,341,142 | 8/1994 | Reis et al. | 342/64 |

OTHER PUBLICATIONS

Rotman et al, —IEEE Transactons on Aerospace And Electronic Systems—vol. 30, No. 1—Jan. 1994 entitled "Clutter Metrics for Target Detection Systems" pp. 81–91.

Reynolds—SPIE vol. 1311 Characterization, Propagation, and Simulation of Infrared Scenes—entitled "Toward Quantifying Infrared Clutter"—1990—pp. 232–242.

Rioul et al.—IEEE Signal Processing—Oct. 1991—entitled "Wavelets And Signal Processing"—pp. 14–37.

*Primary Examiner*—Emanuel T. Voeltz
*Assistant Examiner*—Thomas Peeso
*Attorney, Agent, or Firm*—M. W. Sales; W. K. Denson-Low

[57] ABSTRACT

A method for measuring and quantifying clutter, and target detection and tracking systems that employs wavelet-based clutter quantification to generate a clutter number and a signal-to-clutter ratio derived therefrom to achieve improved target detection performance. The method processes video signals representative of an image scene containing a target and background clutter to provide for more accurate tracking of the target by a tracker(s). The method comprises processing the video signals to compute a wavelet clutter number, processing the video signals to compute a signal-to clutter ratio using the wavelet clutter number, and generating a pointer to a lookup table that sets parameters and selects the tracker that is to be used to track the target based upon the computed signal-to clutter ratio.

20 Claims, 3 Drawing Sheets

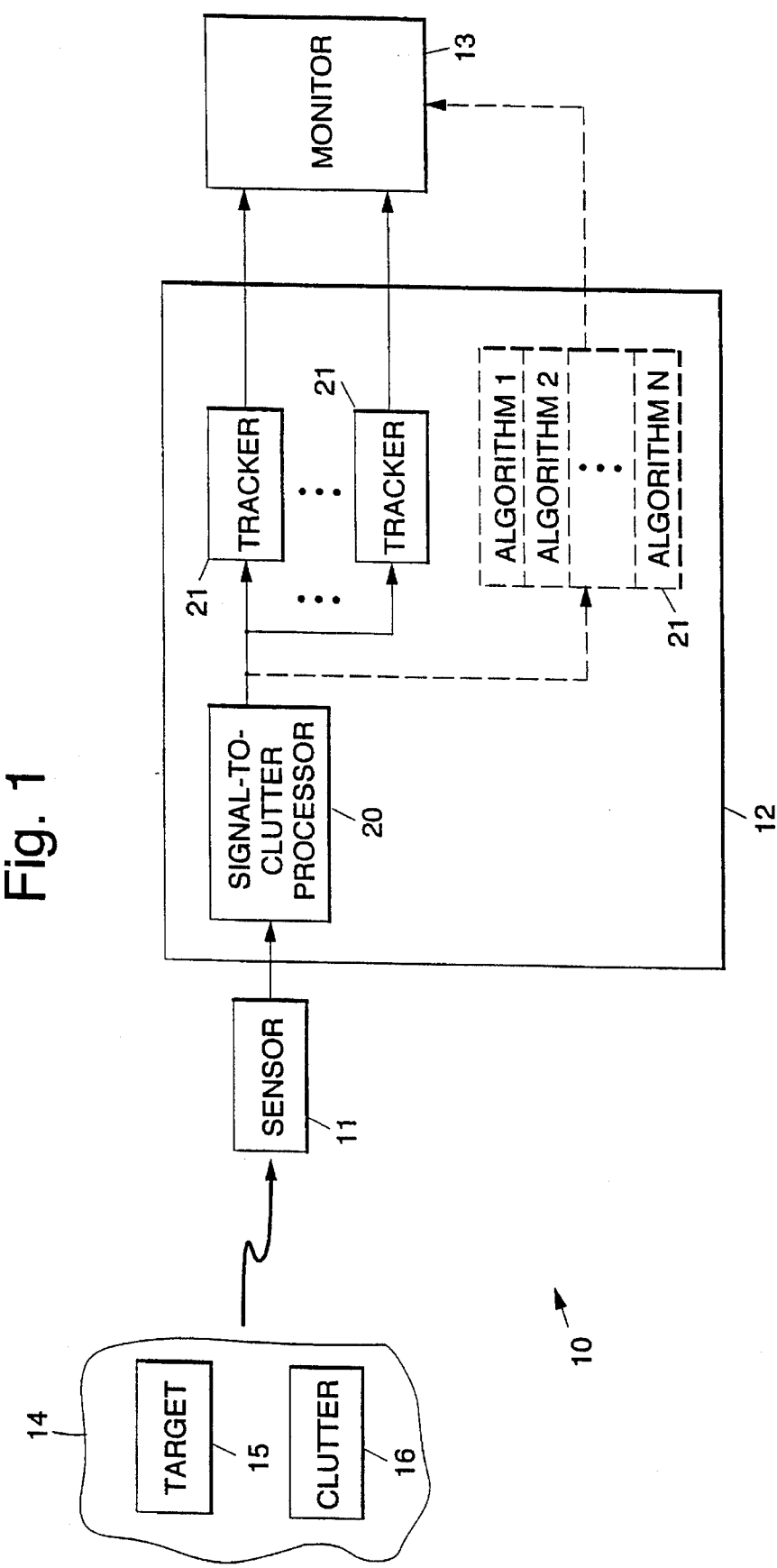

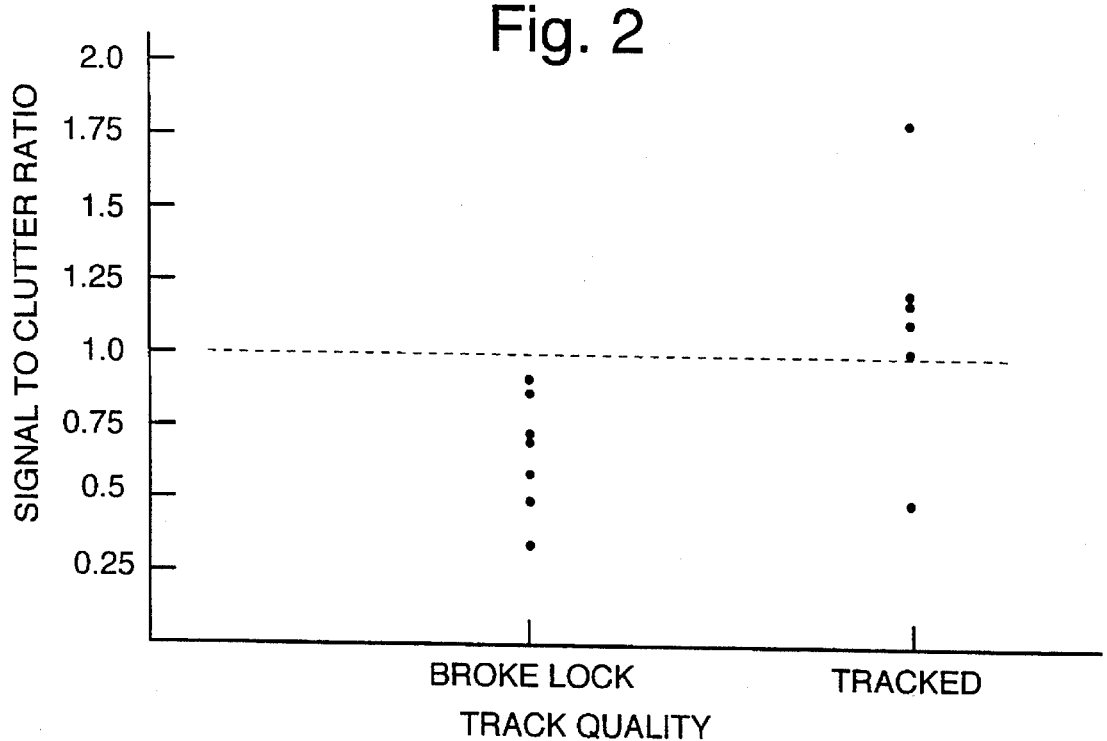
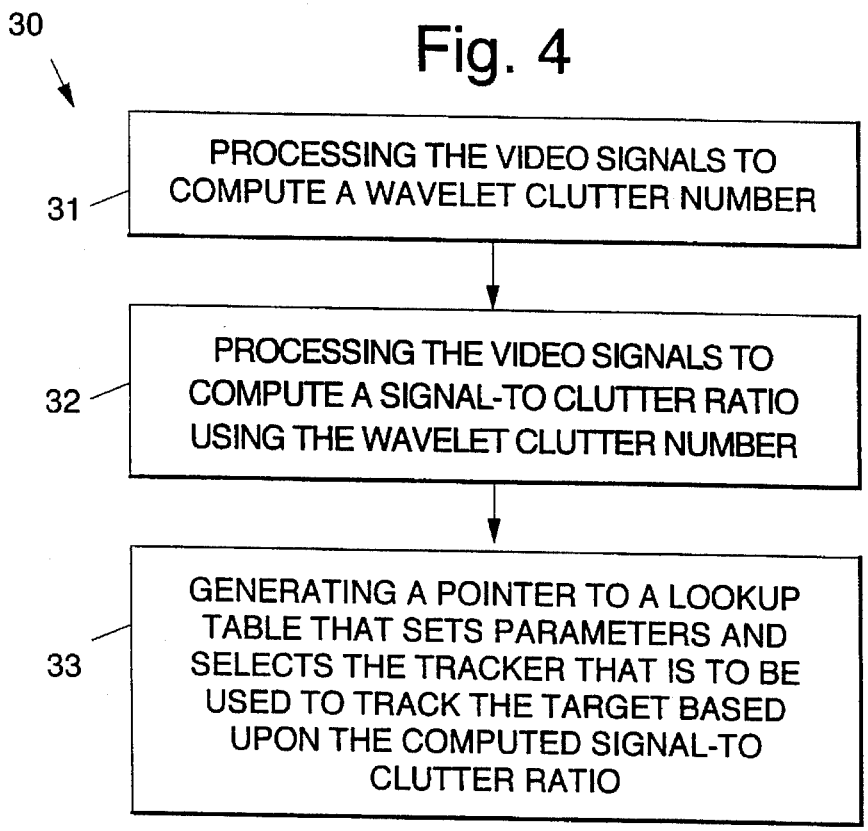

IMAGE-BASED DETECTION AND TRACKING SYSTEM AND PROCESSING METHOD EMPLOYING CLUTTER MEASUREMENTS AND SIGNAL-TO-CLUTTER RATIOS

BACKGROUND

The present invention relates generally to electro-optical tracking systems, and more particularly to an image detection and tracking system that uses clutter measurement and signal-to-clutter ratios based on the clutter measurement to analyze and improve detection and tracking performance.

A detection and tracking system detects and follows an object of interest or target in a sensor's field of view. The sensor detects target radiation and converts it into electrical signals that are processed by a tracker. The tracker converts the electrical signals from the sensor into target position information, allowing the system to follow the target. The system contains processors, which may include general purpose computers and special signal-processing electronics that are linked to memories I/O devices, and other subsystems. The detection and tracking algorithms employed in the sensor and tracker may be implemented in custom or commercial hardware, software, or a combination of the two. In an imaging detection and tracking system, the input signal is a two-dimensional array of points, or pixels. This array of pixels may also be displayed to an operator, along with special symbols to indicate important objects.

The system distinguishes objects of interest from the background according to models dictated by system requirements. Targets often cover many image pixels, allowing them to be modeled by attributes such as shape, texture, edge strength, motion, or color contrast, for example. A target may be detected or tracked only when the model parameters succeed in discriminating the target from the background clutter. Clutter is defined as any object in a scene that interferes with target detection and tracking. The degree of interference depends on the similarity between the clutter and the target of interest. This similarity, in turn, depends on two factors: the target and scene models that are employed in the system.

Human beings can intuitively judge the degree of clutter that the scene model must overcome, but often, this judgment is incorrect. A scene that is judged to have a high level of clutter may present no difficulty to the system if the object to be detected or tracked can be readily distinguished by cues such as contrasting color or motion through the scene. Conversely, a scene that may be judged to contain little clutter can be an insurmountable challenge to the system if the cluttered background is similar to the intended targets in all features that the system detects. For example, a simple detection model designed to discriminate a dark-colored aircraft in front of light-colored clouds will fail to detect an aircraft flying in front of a dark mountain. A more sophisticated system tuned to solve this problem might locate the helicopter unerringly but be entirely insensitive to other types of aircraft in the scene.

Clutter is a pervasive problem for detection and tracking systems, yet limited useful work has been performed to measure it. Clutter complexity is usually determined subjectively, and only in reference to the target of interest. These criteria lead to inconsistencies in performance measurement and miscommunication among system designers with reference to clutter levels. Therefore, it is necessary to quantify clutter to predict measure, and improve tracker performance.

There are a number of methods of clutter quantification that have heretofore been studied or employed in imaging trackers. Previous studies have typically used two types of clutter or image measurements: (1) global or background-only measures such as image standard deviation, entropy, or edges per unit area; and (2) target-dependent measures that incorporate apriori target information, which becomes the basis of the measure because clutter is then a relative term. These measures include average target edge strength, size, aspect ratio, and target-to-background contrast. A paper by Trivedi et al. entitled "Quantitative Characterization of Image Clutter: Problem, Progress, and Promises," Proceedings of the SPIE Conference on Characterization, Propagation and Simulation of Sources and Backgrounds III, Orlando, Fla., April, 1993, describes the use of the inertia of gray-level co-occurrence matrices to quantify clutter, but the clutter measure is dependent upon the target of interest.

In developing the present invention, characterization of ground clutter was initially attempted using the power spectral density analysis. The power spectral densities for various clutter scenes were calculated, and many power law fit ranking experiments were run. The power law fit results varied significantly within a given scene, and the power law rankings did not correlate well with subjective scene clutter rankings or with tracker performance. It was found that for ground scene clutter, the Markov assumption of stationarity that the statistics of all local regions are similar throughout the image did not hold. This result prompted the development of the present invention.

Because of the inability of the power spectral density analysis described above to adequately characterize ground clutter, the use of a two-dimensional wavelet transform for clutter analysis was investigated for use in the present invention, because of the unique properties of wavelets. The two-dimensional wavelet transform provides a means for decomposing an image in terms of both position and spatial frequency. Wavelets are generally well-known in the art and will not be discussed in detail herein. However, wavelets are generally discussed in Rioul et al., "Wavelets and Signal Processing," IEEE Signal Processing, pp. 14–37, October, 1991, and Daubechies, "Ten Lectures on Wavelets," CBMS, SIAM, 1992, for example.

Consequently, and in view of the above, it is an objective of the present invention to provide a method for measuring and quantifying clutter that provides a clutter measure that is independent of the object of interest. It is a further objective of the present invention to provide a method for generating a signal-to-clutter ratio based on the clutter measure that may be used to analyze and improve the detection and tracking performance of imaging detection and tracking systems and other image-processing systems. It is a further objective of the present invention to provide a detection and tracking system that uses the signal-to-clutter ratio to improve target detection and tracking of targets.

SUMMARY OF THE INVENTION

In order to meet the above and other objectives, the present invention is an image processing method and a target detection and tracking system that employs wavelet-based clutter quantification to generate a clutter number and a signal-to-clutter ratio derived therefrom to achieve improved target detection performance.

The method comprises the following steps for processing video signals representative of an image scene containing a target and background clutter to provide for more accurate tracking of the target by a tracker. The first step is to process the video signals to compute a wavelet clutter number. The next step is to process the video signals to compute a signal-to clutter ratio using the wavelet clutter number. The computed signal-to clutter ratio corresponds to target contrast divided by the clutter number, and the target contrast is defined as the difference between a peak gray level ($P_t$) of the target and a mean background gray level ($\mu_b$).

The target detection and tracking system can track a target located in an image scene containing clutter. The system comprises a sensor for generating video signals representative of the image scene; a tracking computer coupled to the sensor; and a display monitor coupled to an output of the tracking computer for viewing the tracked target and the image scene. The tracking computer includes a wavelet-based signal-to-clutter processor for processing the video signals to compute a wavelet clutter number and a signal-to clutter ratio from the wavelet clutter number. The tracking computer further includes tracker means, responsive to the computed signal-to clutter ratio, for implementing at least one tracking algorithm to track the target.

In one embodiment the tracking computer comprises a plurality of trackers and a wavelet-based signal-to-clutter processor coupled between the sensor and each of the plurality of individual trackers. The respective individual trackers implement predetermined tracking algorithms that are designed to track different types of targets. The wavelet-based signal-to-clutter processor computes the wavelet clutter number and the signal-to clutter ratio, and then selects a particular tracker or tracking algorithm that is to be used to track the target based upon the computed signal-to clutter ratio.

In an alternative embodiment, the tracking computer comprises a single tracker that implements a plurality of distinct tracking algorithms that are designed to track different types of targets. In still another embodiment, the tracking computer implements a single tracking algorithm.

The wavelet-based signal-to-clutter processor computes the wavelet clutter number ($C_N$) in accordance with the equation $$C_N = \sqrt{E} \text{ where } E = \frac{1}{MN} \sum_m \sum_n (w(m,n))^2$$

and where E is the energy in decomposed high-pass subbands of the image for vertical and diagonal orientations, w(m,n) is the intensity of a wavelet transformed image at location (m,n), and M,N are dimensions of the image, and computes the signal-to clutter ratio (SCR), equal to target contrast divided by the clutter number, in accordance with the equation $$SCR = \frac{Pt - \mu_b}{C_N}$$

where the contrast is defined as the difference between a peak gray level ($P_t$) of the image and a mean local background gray level ($\mu_b$).

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a target detection and tracking system in accordance with the principles of the present invention;

FIG. 2 shows track quality (track or broke lock) versus target signal-to-clutter ratio for thirteen video sequences.

FIG. 4 illustrates a processing method in accordance with the principles of the present invention.

DETAILED DESCRIPTION

Figure 3:
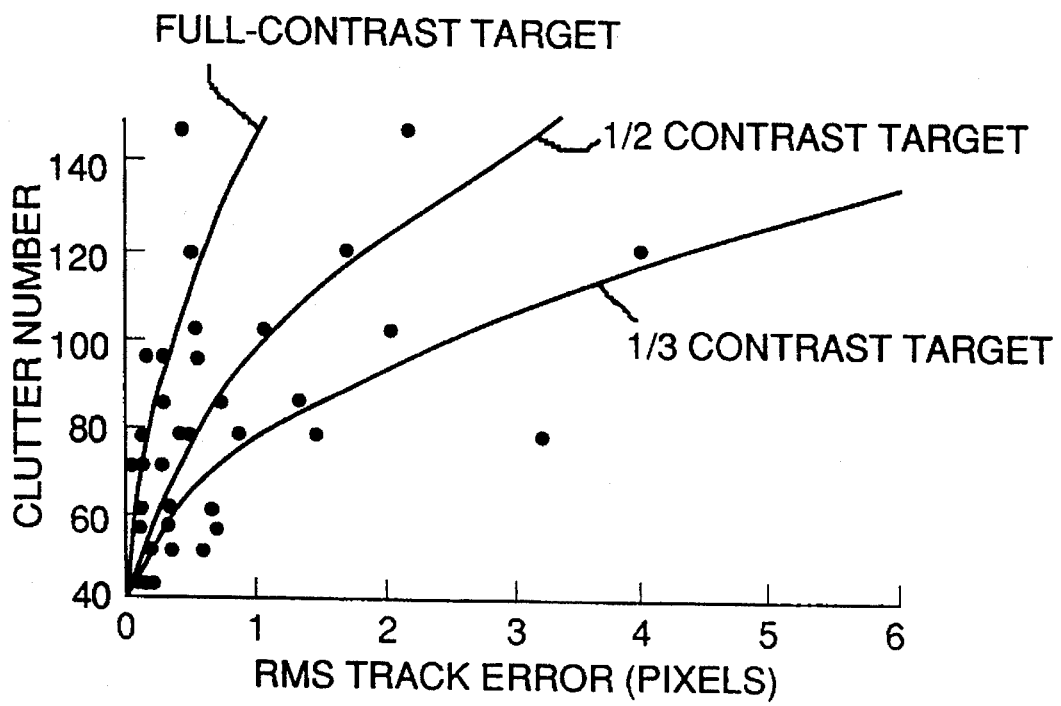
FIG. 3 shows rms track error performance in various clutter levels for three target contrast levels.

FIG. 1 illustrates a target detection and tracking system 10 in accordance with the principles of the present invention. The target detection and tracking system 10 employs a sensor 11 that is coupled to a tracking computer 12 whose output is coupled to a display monitor 13 for viewing. The sensor 11 may be a scanning forward looking infrared (FLIR) sensor, or a video (television) sensor, for example. The sensor 11 generates video signals representative of an image scene 14 that contains a target 15 and background clutter 16.

The tracking computer 12 is an image processing computer that includes a wavelet-based signal-to-clutter processor 20 in accordance with the present invention that may be coupled to a plurality of specialized trackers 21 that implement tracking algorithms that are specifically designed to track different types of targets in different types of environments. Alternatively, the tracking computer 12 may comprise a single tracker 21 (shown with dashed lines) that implements a plurality of distinct tracking algorithms that are designed to track different types of targets 15, and the wavelet-based signal-to-clutter processor 20. For example, one tracker 21 or algorithm may be designed to track low-contrast targets 15 in simple backgrounds, while another may be designed to track high-contrast targets 15 in highly-textured backgrounds. The tracker 21 could be a dual mode tracker, which is disclosed in U.S. Pat. Nos. 4,133,004; 4,719,584; and 4,849,906, all assigned to Hughes Aircraft Company, the assignee of the present invention.

The wavelet-based signal-to-clutter processor 20 computes a wavelet clutter measure and a signal-to clutter ratio as will be described below, and generates a control or selection signal that selects a particular tracker 21 that is to be used to track the target 15 based upon the signal-to clutter ratio. The wavelet-based signal-to-clutter processor 20 employs wavelet-based clutter quantification that is used to improve the tracking performance of the system. The wavelet transform is used to spatially isolate areas of interest and to analyze the frequencies of interest contained in the image 14 that is processed. The frequency analysis properties are similar to the power spectral density but not sensitive to periodic noise. The wavelet transform preserves both local and global information, so it is well-suited to imaging target detection and tracking.

The wavelet-based signal-to-clutter processor 20 generates a wavelet clutter measure specifically developed for images containing ground scene clutter 16. The wavelet clutter measure is defined as a sum of the energy in decomposed high-pass subbands of the image 14 for vertical and diagonal orientations. The energy measure is given by the equation $$E = \frac{1}{MN} \sum_{m} \sum_{n} (w(m,n))^2$$

where w(m,n) is the intensity of the wavelet transformed image at location (m,n), and M,N are the image dimensions. A better understanding of the wavelets and the mathematics associated therewith may be found from a reading of the Rioul et al. and Daubechies references cited above. The clutter number is defined as $$C_N = \sqrt{E}$$

where E is calculated over selected bands of the wavelet transformed image.

The horizontal orientation is not used in the measure due to horizontal artifacts introduced by the scanning sensor 11 and field interlace noise introduced by image digitization in the sensor 11. The energy in the horizontal filtered bands, due to this measurement noise, tends to outweigh energy in the other bands for scanned infrared imagery, and thus is ignored.

The clutter number, $C_N$, is calculated for many video scenes, including the image scenes 14 shown and ranked in FIG. 2. While this ranking may not be identical to what an observer would choose, the ranking clearly separates high-clutter image scenes 14 from low-clutter image scenes 14. The clutter number, $C_N$, is a quantitative measure of the clutter 16 contained in the image scene 14. The wavelet-based signal-to-clutter processor 20 generates the signal-to-clutter ratio that improves the ability to specify, measure, and predict target tracking performance in given clutter levels.

Figure 5:
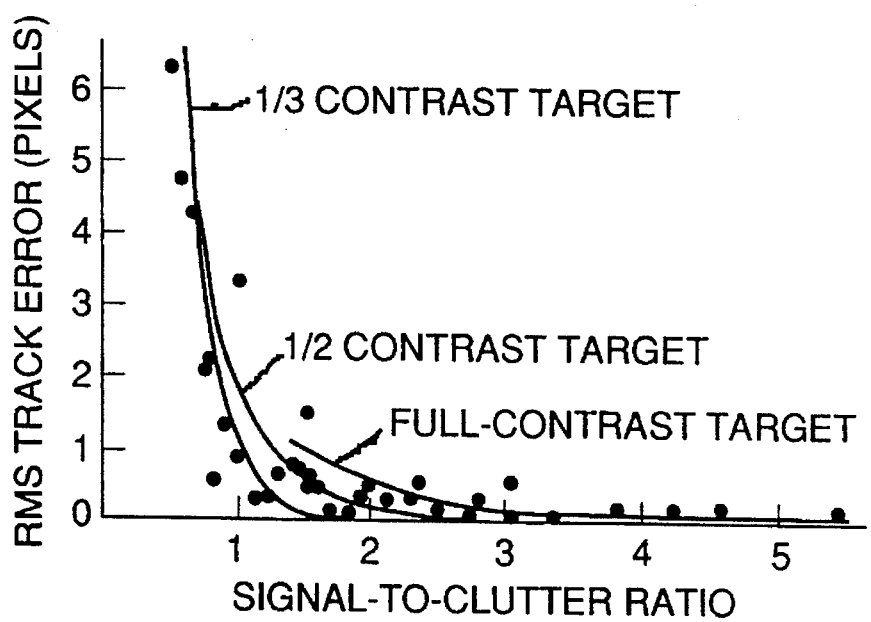
FIG. 5 shows a plot of rms track error versus signal-to-clutter ratio for the system of FIG. 1.

Since target contrast is the most discriminating factor in track error measurements for a given level of clutter 16, the signal-to-clutter ratio (SCR) is defined as the target contrast divided by the clutter measure $$SCR = \frac{P_t - \mu_b}{C_N}$$

where the contrast is defined as the difference between a peak gray level ($P_t$) of the target 15 and a local background gray level ($\mu_b$). FIG. 5 shows a plot of rms track error versus signal-to-clutter ratio. The signal-to-clutter ratio allows prediction of target tracking performance in given clutter levels for particular target signatures, as well as a repeatable, quantifiable target tracking performance measurement. FIG. 5 shows that a target 15 having a signal-to-clutter ratio above 1 is trackable with tracking algorithms developed by the assignee of the present invention and employed in the trackers 21.

When the tracking computer 12 employs a plurality of algorithms, the clutter number could be used as follows. The clutter number at target acquisition time could determine the initial tracking algorithm. For example, a centroid tracking algorithm could be used when the clutter number is greater than 2.5, a correlation tracker could be used when the clutter number is between 2.5 and 1.0, and acquisition could be aborted and re attempted when the clutter number is less than 1.0. As tracking continues, the clutter number would monitored. If the clutter number decreases, the centroid threshold could be increased, the track algorithm could switch to correlation, the track loop bandwidth could be reduced, or a track "coast" could be initiated. "Coasting" a track is when the estimated target rates are used to propagate the target position, while the actual measurements are ignored. The clutter number, as well as other target parameters, could be monitored during coast to determine when the target is again trackable.

When the tracking computer 12 employs a single algorithm, the signal-to-clutter ratio could be used to vary parameters within the algorithm. For example, the centroid threshold level of a single threshold centroid algorithm could be raised when the target signal-to-clutter ratio drops below a desired minimum level, such as 1.5.

To validate the clutter number, a series of experiments were conducted to measure target track error performance in cluttered scenes 14. Various target signatures, corresponding to different targets 15, were inserted with motion into both a clutter-free control scene 14 and a set of digitized video sequences representative of image scenes 14 with differing clutter characteristics.

The rms track error was determined by applying the tracking computer 12 to video sequences of FIG. 4 and measuring the tracked position of the target 15 in each clutter sequence compared to the position of the target 15 in the control sequence. The tracking computer utilized two algorithms: a correlation algorithm and a centroid algorithm. Additional experiments focused on imaging target tracking performance for a constant target 15 in scenes 14 of differing levels, and for size and contrast variations of the same target 15 in a constant level of clutter 16. The wavelet clutter number correlates highly with target track error performance, and target contrast is a major discriminator for tracking performance in clutter 16. FIG. 3 shows rms track error performance in various clutter levels for three target contrast levels. This information was used to test the definition of signal-to-clutter ratio as is described below.

Benchmarking of the performance of the tracking algorithms employed in the tracking computer 12 has been performed. A collection of 30 challenging video sequences for imaging target tracking has been compiled in a target tracking test tape. During benchmarking of the tracking computer 12, the targets 15 in each video sequence are tracked. Prior to development of $C_N$ and the signal-to-clutter ratio, tracker performance on the benchmark tape was based on the number of sequences in which a tracking computer 12 did not lose lock on the target 15. This is a common method of performance evaluation. Based upon the signal-to-clutter ratio results depicted in FIG. 3, the tracking computer 12 is able to track any target 15 in the benchmark tape for which the signal-to-clutter ratio exceeds 1. This was verified by measuring actual signal-to-clutter ratios for sequences benchmarked through the tracking computer 12. FIG. 2 shows track quality (track or broke lock) versus target signal-to-clutter ratio for thirteen video sequences. All of the sequences with target signal-to-clutter ratio greater than one tracked successfully. With the exception of one sequence, all those with target signal-to-clutter ratios below one broke lock. The signal-to-clutter ratio derived in accordance with the present invention may thus be used to predict tracker performance in given clutter environments and to benchmark improvements made to target tracking algorithms employed in the tracking computer 12.

For the purposes of completeness, FIG. 4 illustrates a processing method 30 in accordance with the principles of the present invention. The method 30 comprises the following steps for processing video signals representative of an image scene 14 containing the target 15 and background clutter 16 to provide for more accurate tracking of the target 15 by a tracker 21. The first step is to process 31 the background (scene) video signals to compute a wavelet clutter number. The next step is to process 32 the target area video signals to compute a signal-to clutter ratio using the wavelet clutter number. The last step is to generate a pointer to a lookup table that sets parameters and selects the tracker 21 that is to be used to track the target 15 based upon the computed signal-to clutter ratio. The computed signal-to clutter ratio corresponds to target contrast divided by the clutter number, and the target contrast is defined as the difference between a peak gray level ($P_t$) of the target 15 and a local background gray level ($\mu_b$). The computed the signal-to clutter ratio (SCR) equals target contrast divided by the clutter number.

Thus described has been a new and improved method for measuring and quantifying clutter. Also described has been image detection and tracking systems utilizing clutter measurement and a signal-to-clutter ratio based on the clutter measurement to analyze and improve detection and tracking performance. These image and tracking systems could be used for commercial and military applications. Commercial applications could include harbor management (tracking ships in harbors for traffic control and/or bridge collision avoidance), airport security (tracking people within crowds), physical security (perimeter surveillance, intruder detection), medical imaging (tracking blood cells, tracking body portions for remote examinations) and visual telephony (head or feature tracking).

It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A target detection and tracking system for tracking a target located in an image scene, said system comprising:
   a sensor for generating video signals representative of the image scene;
   a tracking computer that comprises
      a wavelet-based signal-to-clutter processor for processing the video signals to compute a wavelet clutter number and a signal-to clutter ratio from the wavelet clutter number, and
      tracker means for implementing at least one tracking algorithm to track the target in response to the computed signal-to clutter ratio; and
   a display monitor coupled to an output of the tracking computer for viewing the tracked target and the image scene.

2. The system of claim 1 wherein the sensor is a forward looking infrared sensor.

3. The system of claim 1 wherein the sensor is a scanning forward looking infrared sensor.

4. The system of claim 1 wherein the sensor is a video sensor.

5. The system of claim 1 wherein the tracker means implements a plurality of different tracking algorithms, and wherein said processor generates a signal, based upon the computed signal-to clutter ratio, for selecting a particular algorithm to track the target.

6. The system of claim 1 wherein the tracker means implements a single tracking algorithm that is modified in response to the computed signal-to clutter ratio.

7. The system of claim 1 wherein the processor processes background video signals to compute the wavelet clutter number.

8. The system of claim 1 wherein the processor processes target area video signals to compute the signal-to clutter ratio from the wavelet clutter number.

9. The system of claim 1 wherein the computed signal-to clutter ratio corresponds to target contrast divided by the clutter number, and wherein the target contrast is defined as the difference between a peak gray level ($P_t$) of the target and mean background gray level ($\mu_b$).

10. The system of claim 1 wherein the wavelet clutter number ($C_N$) is computed in accordance with the equation $$C_N = \sqrt{E} \quad \text{where} \quad E = \frac{1}{MN} \sum_m \sum_n (w(m,n))^2$$

where E is the energy in decomposed high-pass subbands of the image for vertical and diagonal orientations, w(m,n) is the intensity of a wavelet image at location (m,n), and M,N are dimensions of the image.

11. The system of claim 1 wherein the computed signal-to clutter ratio (SCR) equals target contrast divided by the clutter number.

12. The system of claim 11, wherein $$SCR = \frac{P_t - \mu_b}{C_N}$$

where the target contrast is defined as the difference between a peak gray level ($P_t$) of the target and a mean local background gray level ($\mu_b$).

13. A method of measuring clutter in an image from an MXN array, the method comprising the step of computing a clutter number according to the equation.

$$C_N = \sqrt{E} \quad \text{where} \quad E = \frac{1}{MN} \sum_m \sum_n (w(m,n))^2$$

where E is the energy in decomposed high-pass subbands of the image for vertical and diagonal orientations, and w(m,n) is the intensity of a wavelet transformed image at location (m,n).

14. The method of claim 13 further comprising the step of computing a signal-to clutter ratio (SCR) according to the equation $$SCR = \frac{P_t - \mu_b}{C_N}$$

where $P_t$ is peak gray level of a target in the image and $\mu_b$ is mean background gray level of a selected background area.

15. The method of claim 13 wherein horizontal orientation subbands of the wavelet transformed image are not used to compute the clutter number.

16. A method of measuring clutter in a video scene from an MXN array, the method comprising the steps of:
   calculating the mean background gray level of a selected background area of the video scene;
   calculating the peak gray level of a target area in the video scene;
   performing a wavelet transform on the selected background area of the video scene;
   calculating a clutter number from the wavelet transformed video scene; and
   calculating a signal-to-clutter ratio from the clutter number, whereby the ratio provides a measure of the clutter in the video scene.

17. A method of tracking a target in an image scene comprising the steps of:
   generating video signals representative of the image scene;

using wavelet based processing of the video signals to generate a wavelet clutter number and a signal to clutter ratio; and tracking the target in response to the signal to clutter ratio.

18. A system for tracking a target in an image scene comprising;

means for generating video signals representative of the image scene;

means for processing the video signals using wavelet based processing to generate a wavelet clutter number and a signal to clutter ratio; and tracking means for tracking said target in response to the signal to clutter ratio.

19. The system of claim 18 wherein said tracking means includes means for selecting a unique tracking algorithm from among a plurality of algorithms in response to the signal to clutter ratio.

20. The system of claim 18 wherein said tracking means uses a tracking algorithm, said tracking means further comprising means for modifying said tracking algorithm in response to the signal to clutter ratio.

* * * * *